No. 856,354. PATENTED JUNE 11, 1907.
C. C. MARTIN & W. D. JONES.
PNEUMATIC AGITATING TANK FOR BUTTER OILS.
APPLICATION FILED SEPT. 4, 1906.
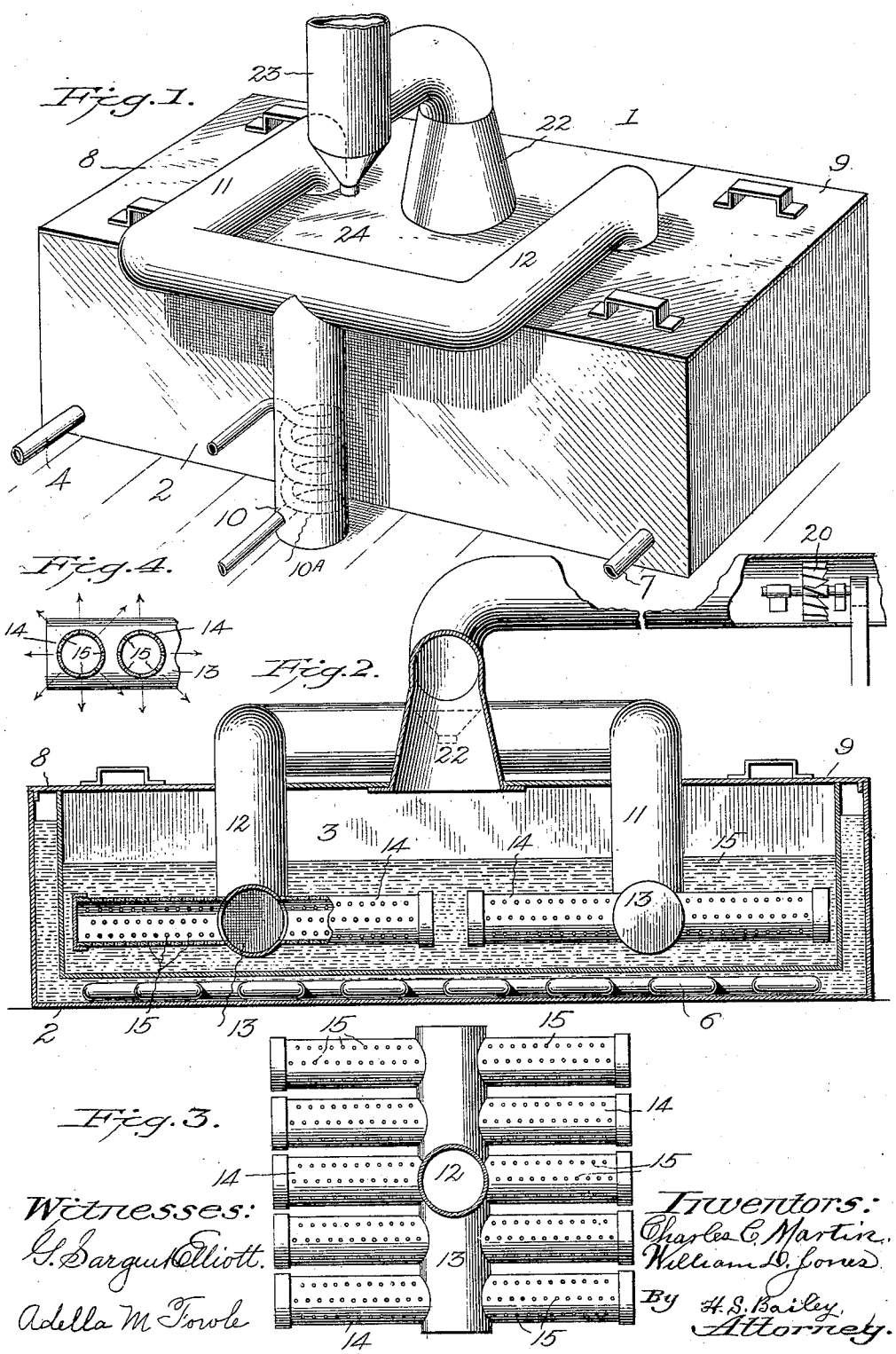

UNITED STATES PATENT OFFICE.

CHARLES C. MARTIN AND WILLIAM D. JONES, OF DENVER, COLORADO; SAID JONES ASSIGNOR TO SAID MARTIN.

PNEUMATIC AGITATING-TANK FOR BUTTER-OILS.

No. 856,354.　　　　Specification of Letters Patent.　　　　Patented June 11, 1907.

Application filed September 4, 1906. Serial No. 333,171.

*To all whom it may concern:*

Be it known that we, CHARLES C. MARTIN and WILLIAM D. JONES, citizens of the United States of America, residing at the city and county of Denver and State of Colorado, have invented a new and useful Pneumatic Agitating-Tank for Butter-Oils, of which the following is a specification.

Our invention relates to a new and improved machine for imparting to melted butter oil, a hot oxygen treatment.

The objects of our invention are: First, to provide a machine that will separate, eradicate, and eliminate the impurities of melted butter oil, and that will destroy and remove its fungus and germ life, and that will renovate, purify, and refine it. Second, to provide a melted butter holding machine, provided with an innumerable number of small hot air discharging apertures that are arranged to be connected to a supply of hot air under pressure, and that are arranged to discharge needle-like jets of hot oxygen into the melted butter oil within the machine, with pressure enough to force the hot air through the melted butter and remove from the butter oil its impurities. And third, to provide a machine in which melted butter oil may be given a hot oxygen treatment, and in which the impurities are removed by air suction. We attain these objects by the mechanism illustrated in the accompanying drawings, in which:

Figure 1, is a perspective view of the improved butter oil renovating and refining tank. Fig. 2, is a vertical longitudinal sectional view thereof. Fig. 3, is a plan view of one of the sets of perforated pipes through which hot air is forced to the interior of the tank. And Fig. 4, is a detail view in section of two of the perforated pipes, illustrating the different directions in which the jets of air are forced.

Similar letters of reference refer to similar parts throughout the several views.

Referring to the drawings, the numeral 1, designates a machine which consists of a double receptacle vessel or tank which we term a pneumatic percolating refiner. This machine is made of such an area of surface that the charge of melted butter oil which is placed in it to be renovated and refined, will be confined in a body of shallow depth, and in this tank we subject the butter oil for a period of time of from about three to five hours, to a continuous agitation, which we impart to it by percolating substantially evenly throughout its area thousands of needle-like jets of hot air under sufficient pressure to have a lifting effect on the butter oil, and of sufficient force to exert a separating, and comminuting and removing effect on the semi-solid, mucilaginous, albuminous, sticky, and other natural or any foreign substance, that may be present in the butter that is under renovating and refining treatment. The amount of time required to treat a charge of butter oil in this pneumatic percolator refiner, depends on the quality of the butter being renovated and refined. This pneumatic percolating and refining machine consists of two tanks 2 and 3, one within the other. The inner tank 3, may be of any desired capacity, but in practice we preferably make it to hold charges of about from twelve to sixteen hundred pounds of butter oil at each charge. This inner tank 3, is made of an area that will permit this charge of butter oil to stand in it at a shallow depth of preferably about a few inches, the depth depending on the pressure of the hot air, but we have found in practice that we obtain the best possible results with a pressure of from about eight to sixteen ounces of hot air per square inch, and with a depth of butter oil of about ten to twelve inches, and we heat the air to a temperature of from about one hundred to two hundred degrees Fahrenheit, and we discharge preferably about ten hundred to twelve hundred cubic feet of hot air into this depth and volume of butter oil per minute.

The inside tank 3, sits within the outside tank 2, and the outside tank 2 is heated by any suitable means, preferably by being filled with water which is heated by a steam pipe 4, extending from a boiler to a pipe coil 6, located within the outer tank, from which an exhaust pipe 7 extends. This hot water is used to keep the butter oil at a proper melted liquid state. The inner tank 3, is a closed tank, and is provided with large entrance covers 8 and 9, which are preferably positioned at the ends of the tank. This pneumatic percolating and refining machine is provided with an air supply pipe 10, from which branches 11 and 12 extend to the opposite end portions of the machine, and extend into the tank to its bottom, where they are each connected to a cross-pipe 13, from the opposite sides of each of which pipes 14 extend, the outer ends of which are provided with removable pipe caps, which may be removed at any time when it is desired to clean the pipes 14. These pipes 14 extend along the bottom of the tank to its central portion, and also to its opposite end portion, and they are provided with innumerable apertures 15, which are placed close together along the pipe and are arranged in the pipes of the coils to discharge the air jets in all directions if desired, but preferably downward, so as to discharge close to or against the bottom of the tank, and at downwardly angles on opposite sides of each pipe. We preferably place fifteen hundred of these hot air jet apertures in each air discharging group of pipes; consequently a tank capable of holding about from twelve to sixteen hundred pounds of butter oil would contain three thousand of these air jet perforations, and the perforations and these groups of pipes are so arranged that these jets of air are discharged close together into the butter oil, and substantially evenly throughout the tanks area and the entire area of the butter oil. The air is supplied by any suitable air compressing machine, such as a blower, from which the pipe 10 extends to the machine.

The hot air that forms the percolating jets may be heated before it enters the blower or after it leaves the blower, or it may be heated in the course of its compression, to the desired degree, if an air compressor is used, but we preferably heat the air by inserting within the pipe 10 that conveys the air from the blower to the tank 3, a steam coil 10A, which is operatively connected to a steam boiler. Then the air as it flows through the pipe 10, also passes through the steam coil within the pipe 10, and is heated to the desired degree of heat, which is regulated at the boiler. This hot oxygen flowing into this sized charge of butter oil under this pressure and in such a great volume per minute, percolates through the butter oil with such a constant steady force that it keeps it in violent agitation, and the air not only most thoroughly charges the butter oil with oxygen, but these needle-like jets of hot air are very piercing and penetrating, and they eliminate moisture, and thoroughly remove also the fungus and germ life, and by its great heat combined with its great force action, which shoots through the mass with thousands of needle-like points, and with the chemical union of the oxygen, the hot air completely saturates, commingles with, and comminutes the molecules of the constituent elements of the butter oil, and removes the semi-liquids and any albuminous substances and all gummy and sticky and mucilaginous matter that is present in the butter oil. This combined great heat and force action of so many thousand needle-like jets of air, force up through the butter oil and carry with them these deleterious, impure, and foreign elements and substances, and they remove, eradicate, eliminate, and drive out germ and fungus life and the greater portion of the moisture, and after from about a two to five hour hot air percolating and refining treatment, the butter oil is reduced to perfectly pure dry butter oil. The air is then shut off, and the butter oil is then removed from this oxygen percolating and refining tank, and is conveyed to an emulsifying tank, where it is mixed with properly pasteurized and prepared milk, or if desired with cream or butter milk or with sour milk, but preferably with pure fresh properly prepared milk, from which air or oxygen either hot or cold or in any form is excluded, as its presence under pressure in the butter oil and milk drives out from the milk and butter oil and emulsifier the bouquet or sweet tasting flavor of the milk, which is the essential element we wish to impart to the butter by this emulsifying treatment. These innumerable hot oxygen jets flow with sufficient pressure up through the butter as to very violently agitate it, and they separate and carry up through the butter oil to its surface and into the space in the tank above it, any impure, foreign, and deleterious matter therein, and this impure, foreign, and deleterious matter is removed from the surface and from above the surface of the butter oil, and from the tank by a suction air blast that is strong enough and has capacity to draw from the tank the discharge of the thousand to twelve hundred feet of hot percolating air jets per minute, and carry all of this matter with it. This suction air blast may be operatively connected to the charge of butter oil by any of the commonly used air suction devices, such as a suction blower or fan 20, and suitable piping leading from above the surface of the butter oil and connected to the receptacle, tank, or vessel in which it is confined to the atmosphere. In the practical application and operation of this feature of our invention, however, we attach a large funnel-shaped pipe 22, to the central portion of the top of the tank, which extends to the atmosphere. A drip trap 23, which is provided with a plugged discharge aperture 24, is formed in the pipe to catch the oil carried into the lower end of the pipe by the suction air blast, and in the pipe a suction fan 20, is placed, which is operatively connected to an electric motor or other source of power, which is of capacity enough to suck the volume of percolating air and force and separate impurities from the butter oil and tank. As soon as this mechanical mixing emulsifying treatment is complete, the emulsified butter oil is run into a cooling and congealing tank, which comprises a tank in which a body of clear pure cold or ice water is placed, into which the charge of emulsified butter oil is run, and this cold water congeals the emulsified butter oil into a pasty mass, which is separated from the water and is conveyed in a reworking tank, which is a tank provided with rotating paddles or blades, that are rotatably connected to a source of power, such as a motor, where it is reworked to a commercially salable and consumable condition.

Our pneumatic percolating refining machine is very simple, practical, and inexpensive in its construction and operation, and it will renovate and refine old butter, and will improve in purity new creamery butter, in a very much less time and with very much less expense than the machines at present in use; and while we have described the preferred construction and arrangement of the machine, we do not wish to be limited to it, as our invention contemplates the use of any apparatus that subjects the butter oil to a hot oxygen treatment, independent of the presence of milk or cream or sour milk or butter milk in or with the butter oil.

We do not illustrate the blower or boiler or emulsifier or the cooling and congealing and reworking tanks, or the system of pipes that connects the blower and boiler to our butter oil renovating and refining tank, as they do not form a part of our present invention.

Having described our invention, what we claim as new and desire to secure by Letters Patent, is:

1. A machine for treating melted butter oil with hot air, comprising a double receptacle, vessel, or tank, one within the other, the outer tank being provided with a supply of water, a steam coil operatively connected to a supply of steam within said outer tank and arranged to heat said water, an inner closed tank adapted to contain a shallow supply of melted butter oil, and arranged to set within said outer hot water tank, an inlet cover at each end of said tank, a main air supply pipe connected to a supply of hot air under pressure, branch air supply pipes leading from said main air supply pipe, extending into said tank, groups of pipes connected to said air supply pipes and extending along the bottom of said inner closed tank and provided at their outer ends with removable caps, and provided throughout their lengths with innumerable air jet discharging apertures arranged to discharge said hot oxygen in any predetermined direction, and arranged and adapted to discharge an innumerable number of needle-like jets of hot air into and through the entire mass of melted butter oil, an exhaust pipe connected at one end between said branch air inlet pipes to said closed tank above the butter oil and extending to the atmosphere, a drip trap in said exhaust pipe provided with a discharge aperture, a removable plug in said aperture, and a suction fan or blower operatively connected to said exhaust pipe and to a source of power, and arranged to draw by air suction superinduced by the force of the pressure of the hot air flowing into said tank, the impurities liberated, separated, and removed from said butter oil by said hot air jets.

2. A machine for treating melted butter oil with percolating needle-like jets of hot air for removing its impurities, which consists of a tank adapted to confine a body of melted butter at a shallow depth, a hot water holding jacket connected to said tank, a steam coil within said jacket, an air supply pipe connected to a supply of hot air under pressure and leading into said tank, air discharging pipes connecting with said hot air supply pipe, said supply pipes being provided with several thousand small perforations arranged and adapted to discharge needle-like hot air jets into said supply of said melted butter oil downwardly against the bottom of said tank, and lying in said tank below said pipes on the bottom of said tank, thereby forcing the settlings of deleterious matter that may settle out of and accumulate on the bottom of said tank up through and out of the body of butter oil in said tank, an air suction pipe connected to the top of said tank, having capacity enough to receive the volume of air flowing into said pipe, a depending drip pipe in said suction pipe provided with a discharge aperture, a removable plug in said drip pipe, and a suction fan or blower in said suction pipe of capacity and suction power enough to lift and draw from the top surface of said body of butter oil such deleterious material as is forced up through the body of butter oil by said hot air jets, as specified.

3. A machine for treating butter oil with hot oxygen to remove its impurities and refine it, which consists of a tank, having a central integral top portion and cover at each end of said tank, and adapted to hold a shallow supply of melted butter oil, a pipe connected at one end to a supply of hot air under pressure, and extending at its opposite end to said tank, branch pipes leading into the opposite ends of said tank, a cross pipe in said tank at the ends of said branch pipes, a plurality of independent pipes connected at one end to said branch pipes and extending in parallel rows across said tank at a short distance above its floor, and provided throughout their surfaces with small perforations arranged to discharge downwardly, removable caps on the outer ends of said pipes, a suction pipe connected centrally to the integral top portion of said tank, a suction fan within said pipe, a depending butter oil catching drip trap in said suction pipe, provided with a discharge aperture and a removable plug in said aperture, substantially as described.

In testimony whereof we affix our signature in presence of two witnesses.

CHARLES C. MARTIN.
WILLIAM D. JONES.

Witnesses:
G. SARGENT ELLIOTT,
ADELLA M. FOWLE.